(12) United States Patent
    Tanquary

(10) Patent No.: US 8,346,617 B1
(45) Date of Patent: Jan. 1, 2013

(54) MERCHANDISING OF CONTENT IN A PREPAID ENVIRONMENT

(75) Inventor: Christopher Tanquary, Newport Beach, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 330 days.

(21) Appl. No.: 12/771,070

(22) Filed: Apr. 30, 2010

(51) Int. Cl.
    *G06Q 30/00* (2006.01)
    *G06F 17/00* (2006.01)
(52) U.S. Cl. .................. 705/26.1; 705/26.7; 705/400
(58) Field of Classification Search ............. 705/26.1, 705/26.7, 400
    See application file for complete search history.

(56) References Cited

U.S. PATENT DOCUMENTS

| 2002/0055906 A1* | 5/2002 | Katz et al. ............... 705/39 |
| 2002/0128916 A1* | 9/2002 | Beinecke, III ............ 705/26 |
| 2003/0167206 A1* | 9/2003 | Shirai ..................... 705/16 |
| 2011/0145149 A1* | 6/2011 | Valdes et al. ............. 705/44 |
| 2011/0191173 A1* | 8/2011 | Blackhurst et al. ....... 705/14.49 |

FOREIGN PATENT DOCUMENTS

JP        2003187122 A    *    7/2003

OTHER PUBLICATIONS

Emmons, Becky, "Improve Your Odds at Rummage Sales," South Bend Tribune, South Bend, Ind., Apr. 15, 2006, p. 1.*
Sterrett, David, "Price Cuts Ahead?" Crain's Chicago Business, Chicago, Oct. 20, 2008, vol. 31, iss. 42, p. 2.*

* cited by examiner

*Primary Examiner* — Amee A Shah

(57) ABSTRACT

A system is provided. The system comprises a computer, a processor, a memory, and an application stored in the memory that, when executed by the processor, receives a message that a communications device has accessed an electronic storefront. The system also determines the amount of funds presently credited to a deposit account associated with the communications device. The system also identifies a first group of products, the first group comprising the products available from the electronic storefront with prices equal to or less than the amount of funds presently credited to the deposit account. The system also transmits pricing information about each of the first group of products to the communications device. The system also transmits instructions to the communications device on arranging the pricing information for each of the first group of products in the display of the communications device.

16 Claims, 6 Drawing Sheets

MERCHANDISING OF CONTENT IN A PREPAID ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An electronic storefront may be a virtual store that users of various types of electronic communications devices may contact to purchase goods and services. An electronic storefront or online shop, eshop, e-store, internet shop, webshop, webstore, online store, or virtual store may evoke the physical analogy of buying goods or services at a bricks-and-mortar retailer or in a shopping mall. Electronic storefronts may be hosted by manufacturers, retailers, and other vendors of goods that also may maintain physical sales locations. While electronic storefronts may be most commonly associated with the Internet and the World Wide Web, electronic storefronts may be operated on other networks, including private networks unrelated to the Internet. Electronic storefronts may be commercially operated on a range of bases. Electronic storefronts may be fully proprietary wherein the operator is selling only goods that the operator manufacturers and may distribute through the operator's own other channels. Electronic storefronts may, by contrast, have no association with a manufacturer or originator of goods and operate independent of these entities. Such electronic storefronts may sell a plurality of types of goods and services originated by many manufacturers and retailers. Such electronic storefronts may be truly virtual and may never physically handle goods sold.

SUMMARY

In an embodiment, a system is provided. The system comprises a computer, a processor, a memory, and an application stored in the memory that, when executed by the processor, receives a message that a communications device has accessed an electronic storefront. The system also determines the amount of funds presently credited to a deposit account associated with the communications device. The system also identifies a first group of products, the first group comprising the products available from the electronic storefront with prices equal to or less than the amount of funds presently credited to the deposit account. The system also transmits pricing information about each of the first group of products to the communications device. The system also transmits instructions to the communications device on arranging the pricing information for each of the first group of products in the display of the communications device.

In an embodiment, a processor-implemented method is provided. The method comprises a merchandising server detecting a communications device initiating contact with an electronic storefront. The method also comprises the merchandising server determining a balance of funds in a deposit account associated with the communications device and a services subscription account. The method also comprises the merchandising server reducing the prices of selected electronic products for sale by the electronic storefront wherein the selected electronic products bear prices higher than the balance of funds and wherein the prices are reduced to levels one of at and below the balance of funds. The method also comprises the merchandising server transmitting price information about the selected electronic products to the communications device wherein the price information comprises the reduced prices of the selected electronic products. The method also comprises the merchandising server transmitting instructions to the communications device on the manner of presentation of the price information in the display of the communications device.

In an embodiment, a method is provided. The method comprises a merchandising server transmitting instructions to a communications device to present in the display of the communications device the highest priced electronic products from a first group of electronic products available for sale, the first group comprising electronic products with individual prices equal to or less than a first amount of funds currently in a deposit account associated with the communications device. The method also comprises the merchandising server receiving a message from the communications device, the message purchasing at least one of the presented electronic products, the message further authorizing debiting the first amount of funds by the purchase price of the at least one electronic product purchased. The method also comprises the merchandising server transmitting instructions to the communications device to present a second group of electronic products in the display, the second group comprising the highest priced remaining electronic products from the first group with individual prices equal to or less than a second amount of funds currently in the deposit account after the debiting.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
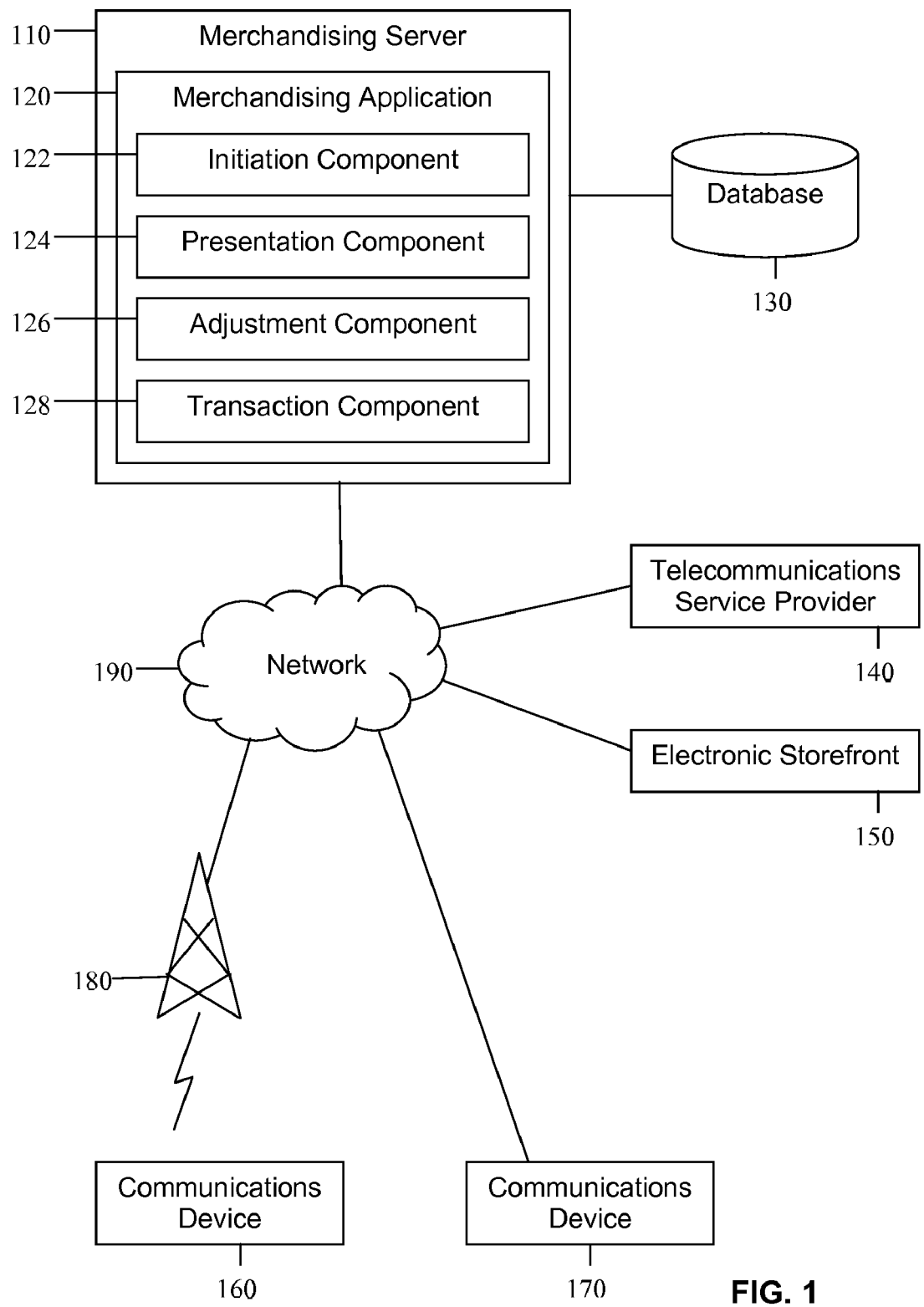
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure provides a system that detects contact by a communications device with an electronic storefront, determines the amount of funds on deposit under a services subscription agreement associated with the communications device, and presents to the communications device the products for sale based on the amount of funds on deposit. The system may present on the communication device products for sale that are affordable given the current amount of funds on deposit and selectively may not present on the communication device other products that are not affordable based on the current amount of funds on deposit. The system may present products for sale in order based on the products' affordability relative to the amount of funds currently on deposit. The system promotes a dynamic electronic storefront that presents pricing and other information based on a customer's available balance of funds. A telecommunications service provider may have a plurality of customers with prepaid subscriptions wherein the customers pay in advance for wireless and other services by remitting funds into a deposit account. The provider may charge or debit the deposit account upon usage of services or on another basis. Some customers may maintain small balances in their deposit accounts. The customers may seek to shop at an electronic storefront for ring tones or other products and may wish to pay for the products by authorizing deductions from their deposit accounts. Such customers maintaining small balances may be unable to afford some products for sale on the electronic storefront. The telecommunications service provider may choose to not present for sale the products that the customer cannot purchase given the customer's current balance in his or her deposit account. The system may present only those products that may be purchased at the present time given the customer's current balance of funds in the deposit account. The system seeks to reduce the possibility that the customer is displayed an item for sale whereupon the customer selects the item for purchase only to receive a message that the sale cannot be completed because of insufficient funds on deposit. The system may promote a positive customer experience and reduce the possibility that the customer will exit the electronic storefront without making any transaction.

The system may send pricing and other information to the communications device with instructions to arrange the information in the display of the communications device in various manners. The instructions may direct the arrangement of the information with the products priced at or immediately below the level of the deposit account depicted most prominently in the display of the communications device. Prominent depiction in the display may comprise the products initially appearing at the top or center of the display or otherwise in a position in the display wherein the user is likely to see and focus on the displayed products first. Products displayed less prominently may be depicted at the bottom of the display or may alternatively not be visible at all in the initial depiction and may only become visible by the user scrolling down the display or otherwise taking action to bring those products into view. Information about other products, for example lower priced products, may be sent to the communications device but may not appear in the initial depiction. As the customer makes purchases of displayed products, the system may remove the information about the purchased products from the display, move up or more prominently display already displayed information about other products, and move into the display information about lower priced products not previously depicted.

The system additionally may implement business rules to effect price adjustments that may comprise applying discounts to a plurality of products. Once the communications device is detected as initiating a session with the electronic storefront, in addition to determining the products priced at or below the current deposit balance, the system may examine the prices of selected more highly priced products. The system may determine if business rules in place permit price adjustments or discounts that may reduce the sale prices of some of the more highly priced products to a level at or below the current deposit balance. If so, the price adjustments or discounts may be selectively applied to those products and the adjusted pricing and other information for the products may be sent to the communications device along with pricing information for products that may not have received price adjustments. The business rules for applying price adjustments may involve a plurality of factors, for example the amount of funds currently in the deposit account, whether the communications device has ever visited the electronic storefront before, and the overall profitability of the relationship with the user of the communications device.

Business rules applied regarding price adjustments may also take into account factors based in part on the nature of the products the customer is purchasing, the quantity the customer is purchasing, and the quantity that may have been sold in a particular geographic area. The business rules may also account for the customer's association with a certain company or group. Early sales to the customer may expose the products and their value to additional potential customers in the company or group and may encourage their purchase. Additional factors that may be considered by business rules comprise socioeconomic and other attributes of the customer, the products being purchased, the time of day and day of week, and the location of the customer at the time of purchase.

Turning now to FIG. 1, a system 100 is provided. The system 100 comprises a merchandising server 110, a merchandising application 120, a database 130, a telecommunications service provider 140, an electronic storefront 150, communications devices 160, 170, a base transceiver station 180, and a network 190.

The merchandising server 110 is a computer system. Computer systems are discussed in detail hereinafter. The merchandising application 120 executes on the merchandising server 110 and is associated with the electronic storefront 150 that sells a plurality of electronic and other products. The products may be installable on or otherwise used by the communications devices 160, 170. The merchandising application 120 detects when the communications device 160 has contact with the electronic storefront 150. The merchandising application 120 interacts with components of the telecommunications service provider 140 to determine the balance of funds the communications device 160 may have on deposit with the telecommunications service provider 140 under a prepaid account for wireless communications or other services. The merchandising application 120 may intervene in the interactions between the electronic storefront 150 and the communications device 160 and may present for sale only the products with sale prices at or less than the level of the balance of funds in the deposit account. The products presented for sale to the user of the communications device 160 may be limited to those that may be purchased with the amount of funds presently on deposit with the telecommunications service provider 140. The merchandising application 120 selectively may adjust the prices of some products that are priced higher than the present deposit balance, reducing the sale prices of the products to or below the present deposit balance, thus enabling the user of the communications device 160 to purchase the products.

The telecommunications service provider 140 may provide wireless communications and other services to a plurality of communications devices 160, 170 on a prepaid basis or on another basis. Customers with prepaid accounts may periodically remit funds in advance to the telecommunications service provider 140 for voice, short message service (SMS), push-to-talk (PTT), and other services accessible from the communications devices 160, 170. As the customers use their communications devices 160, 170 to access wireless services, the telecommunications service provider 140 may charge or debit the deposit account, reducing the account balance. When services usage by the communications device 160 causes the account balance to be reduced to a predetermined level, the telecommunications service provider 140 may require the user to add funds into the account or otherwise replenish the account to a predetermined level. The merchandising server 110, that may be operated by the telecommunications service provider 140, may interact closely with the electronic storefront 150. The merchandising application 120 may monitor the communications devices 160, 170 that establish contact with the electronic storefront 150 and may identify the communications devices 160, 170 that have prepaid subscription accounts with the telecommunications service provider 140. The merchandising application 120 then may provide information on products that could be purchased based on the current account balance to the communications devices 160, 170 for display.

The telecommunications service provider 140 that may operate the electronic storefront 150 as well as the merchandising server 110, may discover that users of communications devices 160, 170 who have prepaid service plans maintain small balances of funds in their deposit accounts with the telecommunications service provider 140, perhaps only several dollars at a time. These users may therefore be unable to purchase some of the products for sale by the electronic storefront 150 given their present funds on deposit. The telecommunications service provider 140 may discover that providing information about a plurality of products to communications devices 160, 170 that cannot be purchased at the current time may be discouraging or frustrating to some users. This may result in the users exiting from the electronic storefront 150 without making any purchase even though a plurality of products still may be affordable. Such an experience may increase the possibility that the customer will not visit the electronic storefront 150 again. The telecommunications service provider 140 may conclude that it is commercially advantageous to provide information about only the products that may be sold given the current balance of funds in the deposit account associated with the communications device 160. Customers with prepaid service plans may find comfort in and become accustomed to knowing that each of the products displayed for sale by the electronic storefront 150 at a given time may be purchased with the funds presently available. Shopping with this knowledge may improve the customer experience and may ultimately have a positive impact on sales even though fewer products may be displayed during a visit to the electronic storefront 150.

The electronic storefront 150 may sell a plurality of products that may be used by the communications devices 160, 170. The products may comprise electronic products installable on the communications devices 160, 170, for example ring tones, music, software applications, and games. The products may also be tangible items such as cases within which the communications devices 160, 170 may be contained or other accessories. While the electronic storefront 150 may be operated by the telecommunications service provider 140, in some embodiments the electronic storefront 150 may be operated by another entity. In these embodiments, the telecommunications service provider 140 and the entity operating the electronic storefront 150 may work cooperatively to allow the user of the communications device 160 to pay for products purchased from the electronic storefront 150 with funds on deposit with the telecommunications service provider 140. In the discussion and examples provided henceforth, the telecommunications service provider 140 may operate the merchandising server 110 and the electronic storefront 150 and the merchandising server 110 and the electronic storefront 150 may share some software and hardware components.

The merchandising application 120 detects or is notified when the communications device 160 makes contact with the electronic storefront 150. The merchandising application 120 may examine records stored in the database 130 associated with the merchandising server 110 to determine the type of account that the communications device 160 has with the telecommunications service provider 140. Coding included in messages sent by the communications device 160 may indicate the type of account. The merchandising application 120 may discover that the communications device 160 has a prepaid account with the telecommunications service provider 140. Under a prepaid account, the user of the communications device 160 pays funds into the deposit account first and is thereafter allowed to use services under the subscription. The telecommunications service provider 140 may draw funds from the account upon each use of services or on another basis. The user may replenish funds in the deposit account on a periodic basis or when the balance of the account drops to or below a predetermined level.

After the merchandising application 120 determines that the communications device 160 contacting the electronic storefront 150 has a prepaid account, the merchandising application 120 may then determine the present balance of the prepaid account. Depending on the present balance, the merchandising application 120 may send a message to the electronic storefront 150 instructing it to generate a listing of only products with selling prices at or below the present balance of the prepaid account of the communications device 160. In an embodiment, the merchandising application 120 may interact with an application programming interface (API) of the electronic storefront 150 such that the functionality of the merchandising application 120 and the functionality of the electronic storefront 150 may be tightly integrated. After it is determined that the communications device 160 has a prepaid account presently in effect and the account contains a quantity of funds permitting the communications device 160 to purchase at least one product, the merchandising application 120 may effectively take over control of some functionality of the electronic storefront 150 and become its front end to the communications device 160.

After the products for sale by the electronic storefront 150 with selling prices at or below the current deposit balance of the communications device 160 have been identified, the merchandising application 120 determines the order, sequence, or other manner in which information about the products is to be displayed by the communications device 160. Price information would be listed and, depending on the type of products, only a text description may be provided, an image of the product may be provided, if applicable, or some other representation may be provided. In some cases, the quantity of products with purchase prices equal to or less than the current deposit balance may be such that pricing and other information for all such products cannot be simultaneously presented in the display of the communications device 160. The merchandising application 120 first may provide information to the communications device 160 for display about the products with selling prices equal to the current deposit balance. If there are not enough products with selling prices equal to the current deposit balance to fill the available space of the display, the merchandising application 120 then may instruct the communications device 160 to list the next highest priced products. The telecommunications service provider 140 may wish to maximize its revenue from the electronic storefront 150 while not providing information about products that the user of the communications device 160 cannot purchase given his or her current deposit balance. When the communications device 160 makes a purchase during a session with the electronic storefront 150, the merchandising application 120 may cause the communications device 160 to move pricing information about additional products into the display.

The merchandising application 120 selectively may adjust the prices of some products through discounting or other methods to permit a communications device 160 to purchase a product with a price higher than its current deposit balance. The telecommunications service provider 140 may institute business rules or policies to apply price adjustments or discounts for some users, some communications devices 160, 170, some products on sale, or combinations thereof, and/or when other predetermined conditions are met. The telecommunications service provider 140 may build flexibility into its pricing such that it may make adjustments in some cases if a user of a communications device 160 appears particularly interested in a certain product or may purchase a large quantity of products. A communications device 160 may have a current deposit balance that is so small that it is less than the selling prices of all products for sale by the electronic storefront 150. The telecommunications service provider 140 may not want the user of the communications device 160 to be turned away from the electronic storefront 150 and be unable to complete a purchase. It may be that user's first time ever visiting the electronic storefront 150 or the user may be young or new to ownership of a communications device 160.

In other cases, the telecommunications service provider 140 may have excessive inventory of some products on hand and may decide to reduce prices to stimulate sales of these products and reduce its inventory. When policies are in effect that permit price adjustments, the merchandising application 120 may select and present to the communications device 160 products whose regular prices are higher than the current deposit balance of the communications device 160. Should the user of the communications device 160 choose one of the more highly priced products, the merchandising application 120 may apply a discount or other method of price adjustment to reduce the price to the level of the current deposit balance, allowing the sale to be completed. In at least one embodiment, the merchandising application 120 may present products with their prices already discounted and therefore not need to apply a discount after the products are selected for purchase.

The database 130 is associated with the merchandising server 110 and may contain a plurality of records used by the telecommunications service provider 140, the merchandising application 120, and the electronic storefront 150. The database 130 may store information about deposit accounts held by the telecommunications service provider 140 for communications devices 160, 170 on prepaid subscription plans. The database 130 may store historical information about the usage of wireless communication and other services by communications devices 160, 170 under prepaid subscription plans and other programs. The database 130 may store information about business rules that describe adjustments to prices of products that may be permitted under some circumstances. The database 130 may store information about business agreements with third party vendors of products, for example ring tones, music, games, and applications, wherein the business agreements describe pricing of the products by the telecommunications service provider 140 or other operator of the merchandising server 110 and the electronic storefront 150 and permitted adjustments to the pricing of the products.

The communications devices 160, 170 may be mobile telephones, personal digital assistants (PDA), and media players. While much of the discussion herein may describe the communications devices 160, 170 as mobile, portable, and wireless communications devices, in an embodiment, the communications devices 160, 170 may communicate with the other components of the system 100 using wired connections.

The electronic storefront 150 may be a software application executing on a computer. The electronic storefront 150 may execute on the merchandising server 110 or may execute on a different computer. In an embodiment, the merchandising application 120 and the electronic storefront 150 may share some components and components of the merchandising application 120 may perform some functionality of the electronic storefront 150.

The base transceiver station 180 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 180, in an embodiment a plurality of base transceiver stations 180 may be existent and in operation.

The network 190 promotes communication between the components of the system 100. The network 190 may be any communication network including a public data network (PDN), a public switched telephone network (PSTN), a private network, and/or a combination.

In an embodiment, the merchandizing application 120 may determine a minimum balance that may allow the customer to conduct a predefined amount of further communication, such as prepaid phone calls and/or prepaid text messages. The predefined amount of further communication may be five additional voice calls, ten additional voice calls, fifteen additional voice calls, or the like. Likewise, the predefined amount of further communication may be ten additional text messages, twenty additional text messages, thirty additional text messages, or the like. The predefined of further communication may be based on a combination of communication types, for example five additional voice calls and ten additional text messages, ten additional voice calls and twenty additional text messages, or other combinations. The merchandizing application 120 may further determine a purchasing balance as a difference between the current account balance and the minimum balance. The merchandizing application 120 may then perform the calculations and functions described above based on the purchasing balance rather than the account balance. In this embodiment, the system 100 may avoid encouraging the subscriber to fully deplete their prepaid account balance, thereby leaving them without communication services until they perform a top-up to replenish funds in their prepaid account balance.

The merchandising application 120 comprises the initiation component 122 that recognizes when the communications device 160 contacts the electronic storefront 150 to begin shopping for products. The communications device 160 may initiate the session using a browser application executing on the communications device 160 to access the electronic storefront 150 that may be an Internet site operated by the telecommunications service provider 140. The communications device 160 may use another means to access the electronic storefront 150, for example an agent or a client interface on the communications device 160. The initiation component 122 may interact with components of the electronic storefront 150 to identify when communications devices 160, 170 access the electronic storefront. The initiation component 122 may examine coding associated with communications devices 160, 170 or aspects of their electronic transmissions to determine the account types of subscriptions associated with communications devices 160, 170. The initiation component 122 may determine when a communications device 160 is associated with a prepaid subscription plan with the telecommunications service provider 140 wherein the user of the communications device 160 remits funds into a deposit account in advance of using communications and other services. The telecommunications service provider 140 may debit or charge the deposit account upon each use of services or on another basis. The user of the communications device 160 may replenish the deposit account with funds when the balance in the account drops to a predetermined level. The user may alternatively deposit funds into the account periodically per the user's agreement with the telecommunications service provider 140, regardless of the balance of the account.

After determining that the communications device 160 is associated with a prepaid subscription plan provided by the telecommunications service provider 140, the initiation component 122 may determine the present balance of the deposit account to determine the amount that the communications device 160 may spend during its present visit to the electronic storefront 150. The initiation component 122 may consult the database 130 or other secure source to determine the present balance of the deposit account. In an embodiment, the balance of the deposit account may change frequently as the user of the communications device 160 uses services to make phone calls, exchange short message service messages, also known as text messages, and use other services. In an embodiment, the user of the communications device 160 also may have authorized the telecommunications service provider 140 to automatically debit the user's bank account or charge a credit card of the user to replenish the balance. In an embodiment, the exact balance of deposit at the moment the communications device 160 makes contact with the electronic storefront 150 may not be determined because of processing delays and an average balance or balance at the end of the previous hour or other time period, for example, may be considered the present balance of the deposit account. In an embodiment, the merchandising application 120 may send a message to the communications device 160 with a prompt or reminder to add funds to the deposit account.

After determining the present balance of the deposit account of the communications device 160, the initiation component 122 determines the products for sale by the electronic storefront 150 with sale prices equal to or less than the present balance of the deposit account. These products may be electronic products executable on the communications device 160, such as applications or ring tones, or may be tangible products usable in conjunction with the communications device 160, such as casing or other accessories. In an embodiment, the products may not be directly associated with the communications device 160. The initiation component 122 uses the present balance to identify the products that may be purchased by the communications device 160. Depending on the nature of the products, the initiation component 122 also assembles the information, that may comprise pricing as well as product information and images, in preparation for sending the information about the products to the communications device 160.

The merchandising application 120 also comprises the presentation component 124 that sends the information about products selected by the initiation component 122 to the communications device 160 for presentation by the display of the communications device 160. The presentation component 124 may direct that the products with sale prices equal to the deposit account balance, or with sale prices closest to but not exceeding the deposit account balance, are presented first in the display followed by the next most expensive products in descending order as the user navigates through the listing. The presentation component 124 may direct that only text information describing the selected products is displayed, the text information providing the name of the product and the price of the product. The presentation component 124 may direct that images may be included in the information sent to the communications device 160. The images may comprise a logo or other symbol representing a software application, for example, that may be sold. The images may comprise photographs or other depictions of artists that created music that may be sold. The images may comprise selectable icons or other symbols that, when clicked on or otherwise activated, play brief sound bites representing samples of ring tones that may be for sale.

The presentation component 124 may detect information about the communications device 160, such as technical specifications of the display or other hardware components of the communications device 160. If a web browser executing on the communications device 160 is used to contact the electronic storefront 150, the presentation component 124 may detect information provided by a web agent associated with the web browser. The web agent may describe the screen resolution, processing power, execution environment, operating system, and other information specific to the communications device 160. The presentation component 124 may use this information to determine the instructions to provide to the communications device 160 in presenting the product information about products that the communications device 160 may purchase using the funds presently in the deposit account.

The merchandising application 120 also comprises the adjustment component 126 that may consult business rules and implement price adjustments that may be permitted by the business rules. This may allow a price of a product to be reduced, for example by applying a discount, to the current level of the deposit account associated with the communications device 160. Some users of communications devices 160, 170 may maintain low balances in their deposit accounts and may therefore be unable to afford some of the products sold by the electronic storefront 150. A user with a balance of $3.00 in his deposit account, for example, may wish to purchase a ring tone with a sale price of $4.00. The adjustment component 126 may examine business rules associated with the ring tone and determine from the business rules that a $1.00 discount is permitted on the ring tone, thus permitting the price to be reduced from $4.00 to $3.00 and displaying the ring tone for purchase at $3.00 and hence the customer being able to follow through with purchasing the ring tone.

The telecommunications service provider 140 may have business agreements with a plurality of outside entities that produce or sell electronic and other products that may be installed and used on or with the communications device 160. The business agreements may recommend pricing for the products and may describe allowed or agreed price reductions for the products, the price reductions expressed in terms of percentages off original selling price, actual dollar amounts that may be discounted from the original selling price, or other method of expression of adjustment. The adjustment component 126 may consult these business agreements when it is determined that the customer has a low present deposit balance, when the customer may be inclined to purchase products that may be somewhat more expensive than the customer may presently afford, when the customer is new, or has some other status. The adjustment component 126 selectively may selectively price adjustments in the form of discounts or other measures to bring the selling price to or below the level of the balance in the deposit account of the communications device 160.

The adjustment component 126 may work with the initiation component 122 when the communications device 160 initiates contact with the electronic storefront 150 to determine if it may be necessary or appropriate to apply price adjustments to products. The adjustment component 126 may work with the presentation component 124 after products have been chosen to determine how the chosen products should be presented. This may be the case when some products chosen for presentation to the communications device 160 have received price adjustments and some chosen products have not received price adjustments.

The merchandising application 120 also comprises the transaction component 128 that works with the electronic storefront 150 to complete a sale transaction with the communications device 160. After the initiation component 122 determines the balance of funds in the deposit account of the communications device 160 and determines the products to present, after the adjustment component 126 applies directed price adjustments, and after the presentation component 124 presents the information for viewing, the transaction component 128 may receive notification that the communications device 160 has chosen to make a purchase. The transaction component 128 may calculate the new balance of funds in the deposit account after the sale is complete. The transaction component 128 may also work with the initiation component 122, the presentation component 124, and the adjustment component 126 to determine how information about the products should be presented to the communications device 160 for display after the transaction is completed. The information about the product involved in the sale will be removed from the display of the communications device 160 and information about at least one product that did not previously appear in the display may be moved into the display and become visible to the user.

The transaction component 128, working with the other components of the system 100, will consider how the balance of the deposit account has changed in determining what products are best shown in the display of the communications device 160. Changes in the balance of the deposit account may prompt changes by the adjustment component 126 in drawing on business agreements stored in the database 130 that describe business rules about applying price adjustments and other discounts. Such changes in pricing and accessibility to products may also call for the presentation component 124 to change the arrangement of products in the display of the communications device 160.

Figure 2:
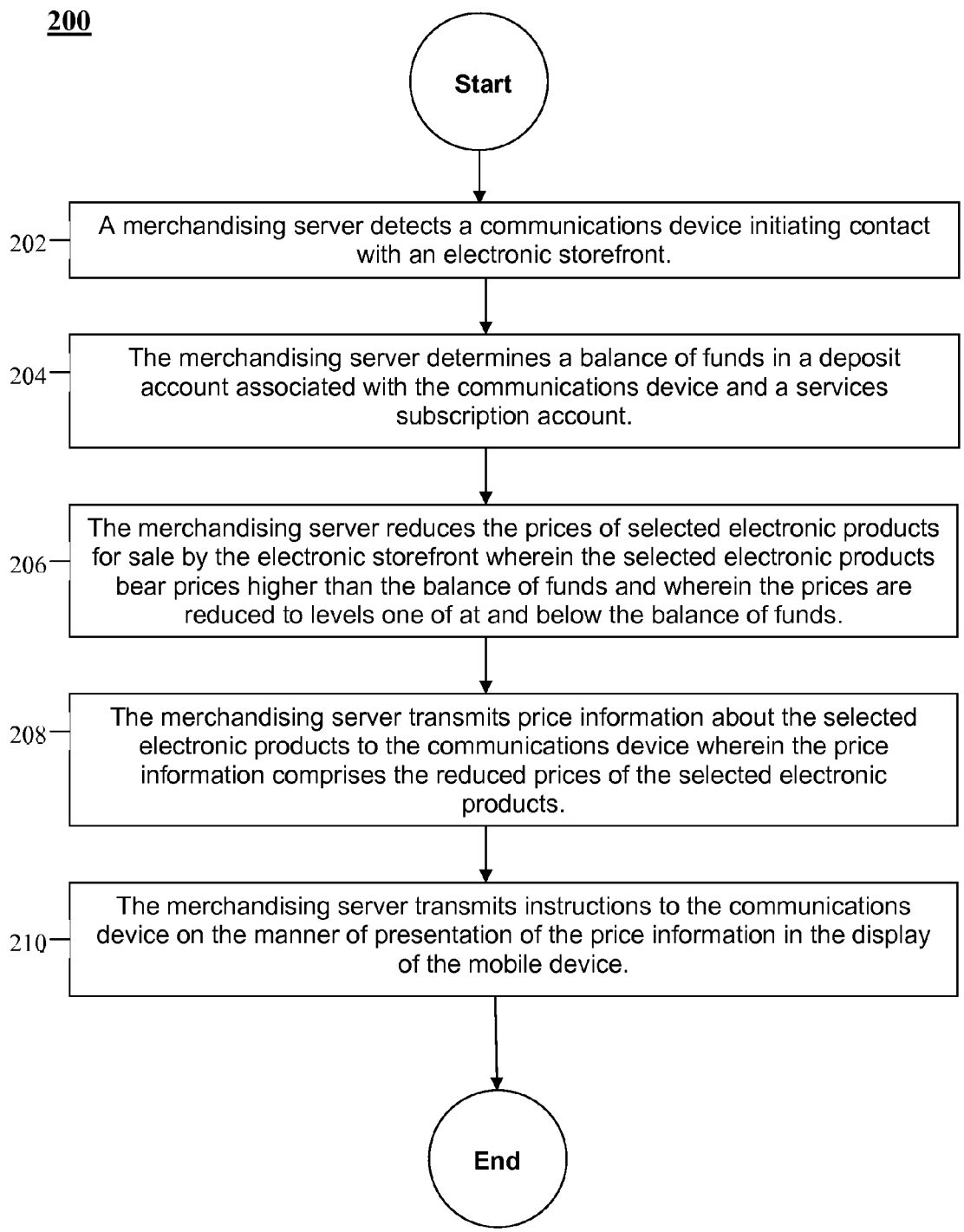
FIG. 2 is a flow chart illustrating a method according to an embodiment of the disclosure.

Turning now to FIG. 2, a processor-implemented method 200 is provided. At block 202, a merchandising server detects a communications device initiating contact with an electronic storefront. At block 204, the merchandising server determines a balance of funds in a deposit account associated with the communications device and a services subscription account.

At block 206, the merchandising server reduces the prices of selected electronic products for sale by the electronic storefront wherein the selected electronic products bear prices higher than the balance of funds and wherein the prices are reduced to levels one of at and below the balance of funds. At block 208, the merchandising server transmits price information about the selected electronic products to the communications device wherein the price information comprises the reduced prices of the selected electronic products. At block 210, the merchandising server transmits instructions to the communications device on the manner of presentation of the price information in the display of the mobile device.

Figure 3:
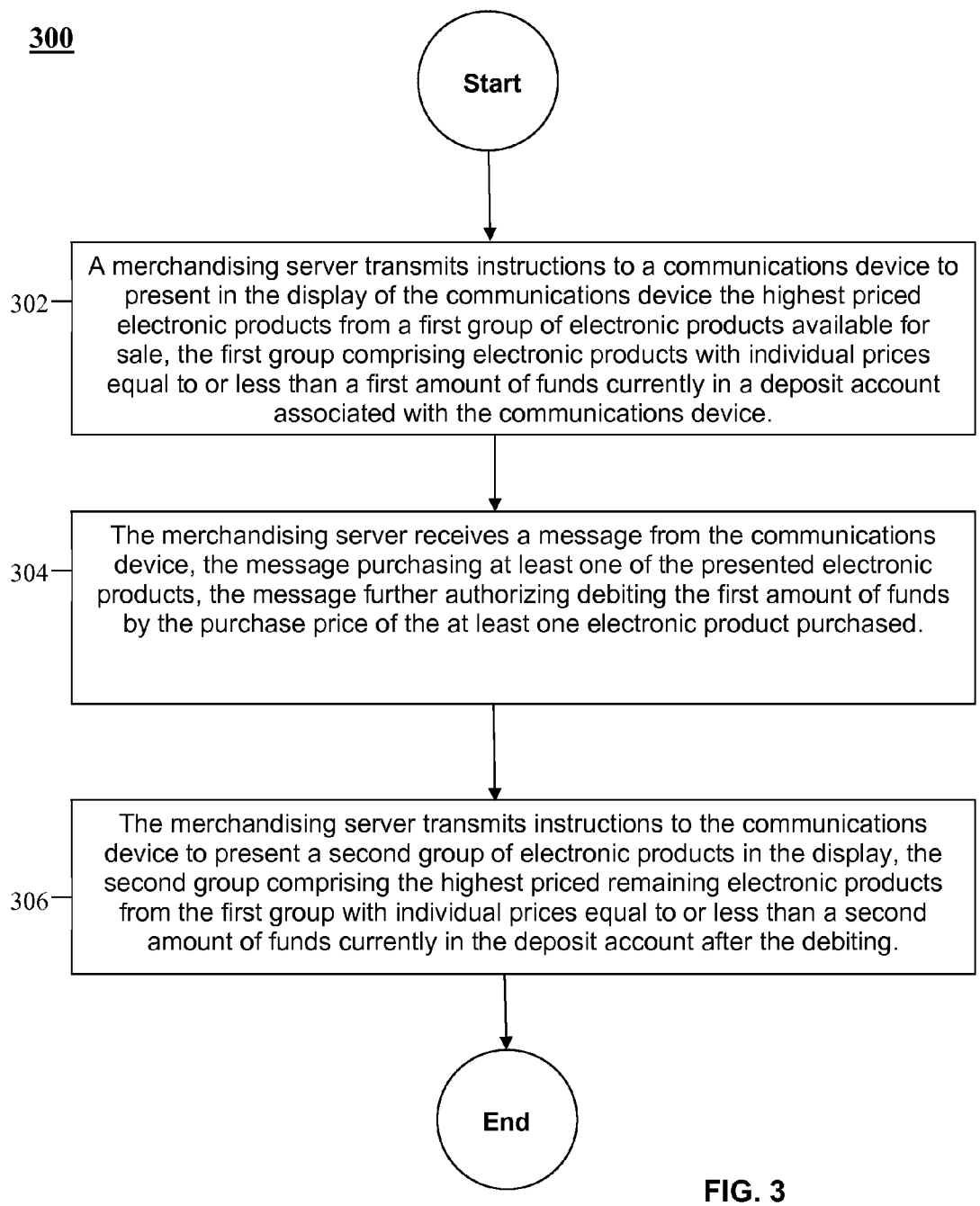
FIG. 3 is a flow chart illustrating a method according to an embodiment of the disclosure.

Turning now to FIG. 3, a processor implemented method 300 is provided. At block 302, a merchandising server transmits instructions to a communications device to present in the display the highest priced electronic products from a first group of electronic products available for sale, the first group comprising electronic products with individual prices equal to or less than a first amount of funds currently in a deposit account associated with the communications device. The merchandising application 120 executing on the merchandising server 110 sends instructions to the communications device 160 to present products with individual prices that are equal to or less than the amount of funds currently in a deposit account maintained by the user or subscriber associated with the communications device 160. In an embodiment, the products may have original or list prices higher than the current amount of funds in the deposit account. The merchandising application 120 may, at the election of the telecommunications service provider 140, apply discounts to the products that reduce the sale prices to the level of or below the current amount of funds in the deposit account. In an embodiment, the merchandising application 120, as previously described, may present products with sale prices at or below a difference between the current account balance and a minimum account balance, as described further above.

The first group may comprise a quantity of electronic products with sale prices at or below the first amount of funds currently in the deposit account that is too large for the communications device 160 to display all at once. When this is the case, the method 300 directs that the products to be displayed first and most prominently are those equal to or just slightly less than the current amount of funds in the deposit account. If the products priced at the level of the current amount of funds are too numerous to be simultaneously displayed by the communications device 160, the merchandising application 120 may use other criteria to determine the products that should be displayed, such as the products that the telecommunications service provider 140 most wishes to sell. If there is still space remaining in the display of the communication device 160 after these products are displayed, then the remaining space is to be populated with products priced immediately below the first or current amount of funds in the deposit account with the most expensive of those products to be displayed most prominently.

At block 304, the merchandising server receives a first message from the communications device, the first message purchasing at least one of the presented electronic products, the first message further authorizing debiting the first amount of funds by the purchase price of the at least one electronic product purchased. At block 304, the communications device 160 purchases at least one of the electronic products offered for sale at block 302.

At block 306, the merchandising server transmits instructions to the communications device to present a second group of electronic products in the display, the second group comprising the highest priced remaining electronic products from the first group with individual prices equal to or less than a second amount of funds currently in the deposit account after the debiting. Because the second amount of funds is less than the first amount of funds, some products in the first group no longer may be affordable and therefore are not included in the second group. In addition, some of the products in the second group may not have been displayed at block 302 because the quantity of products determined at block 302 exceeded the display capacity of the communications device 160. Those products in the first group not displayed at block 302 may have had individual prices equal to the first amount of funds but were not directed for display because there were too many such products. In addition, some products in the first group may have low prices and were not displayed at block 302 since the merchandising application 120 presents the highest price products first, starting with those priced at the level of the current amount of funds in the deposit account. As part of directing the communications device 160 on populating its display with information about products in the second group at block 306, the instructions may direct the inclusion of products that were not included at block 302 because they had low prices. The sale of products at block 304 effectively frees space in the display of the communications device 160 and allows products not displayed at block 302 to be displayed at block 306.

Figure 4:
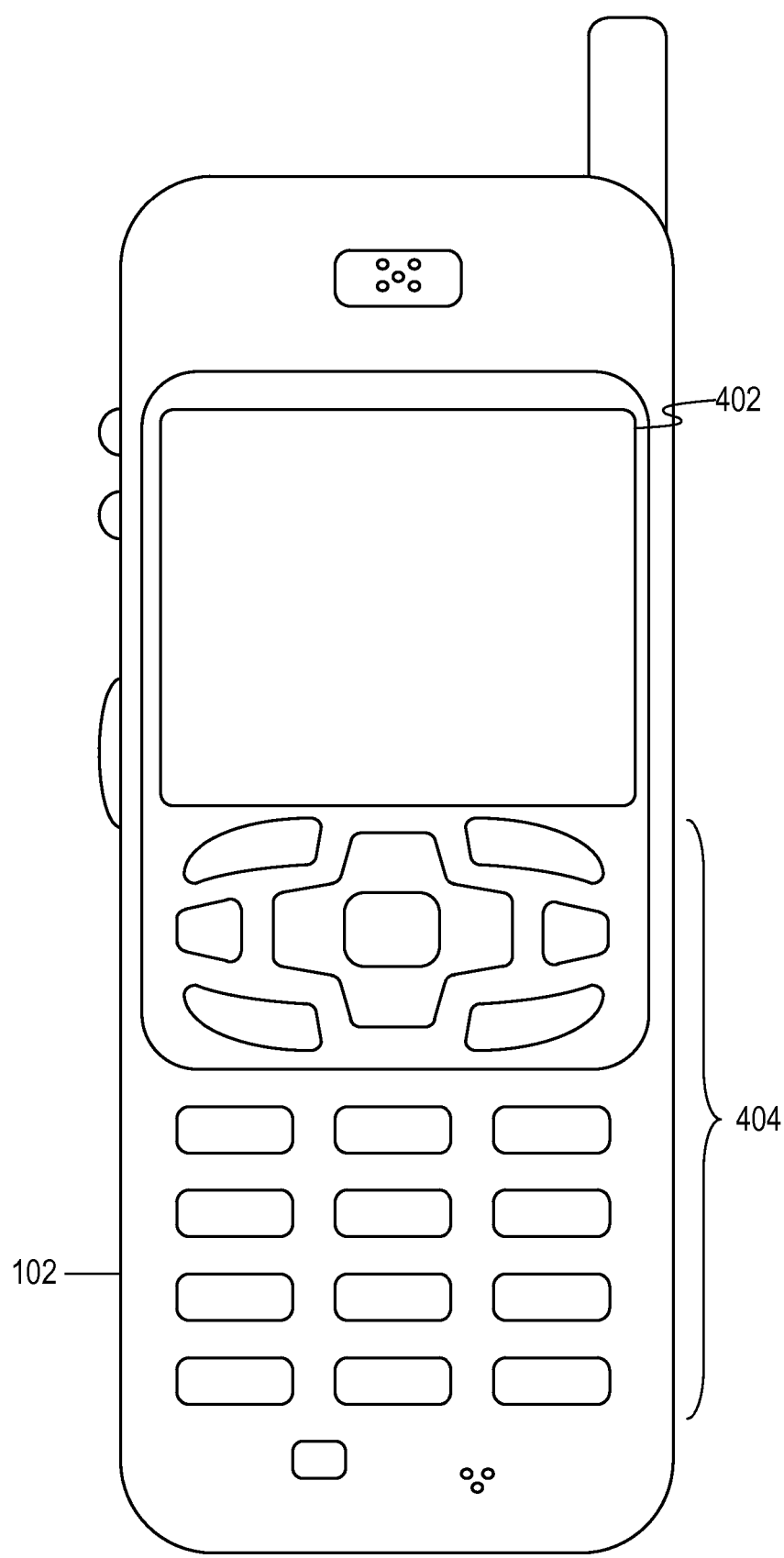
FIG. 4 is an illustration of a mobile device according to an embodiment of the disclosure.

FIG. 4 shows a mobile device 102. FIG. 4 depicts the mobile device 102, which is operable for implementing aspects of the present disclosure, but the present disclosure should not be limited to these implementations. The mobile device 102 may in some embodiments exemplify the communications devices 160, 170 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 5:
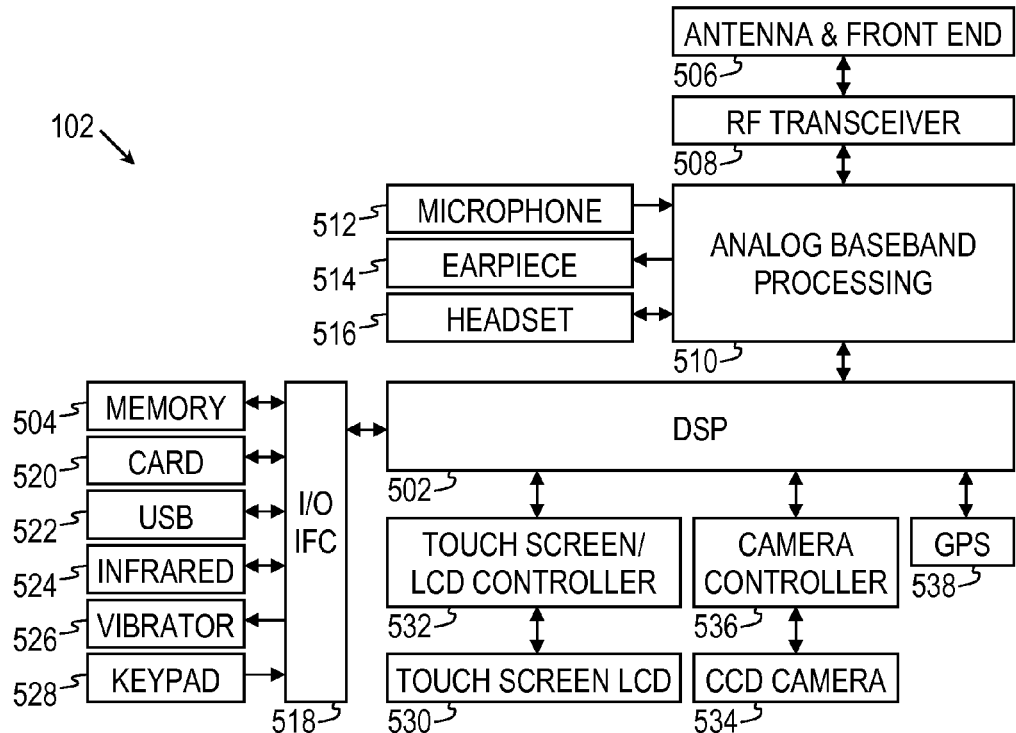
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
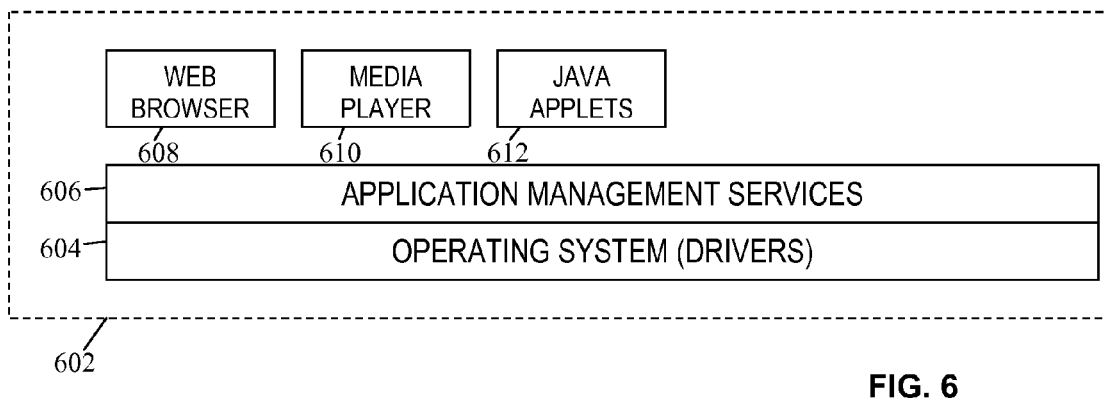
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
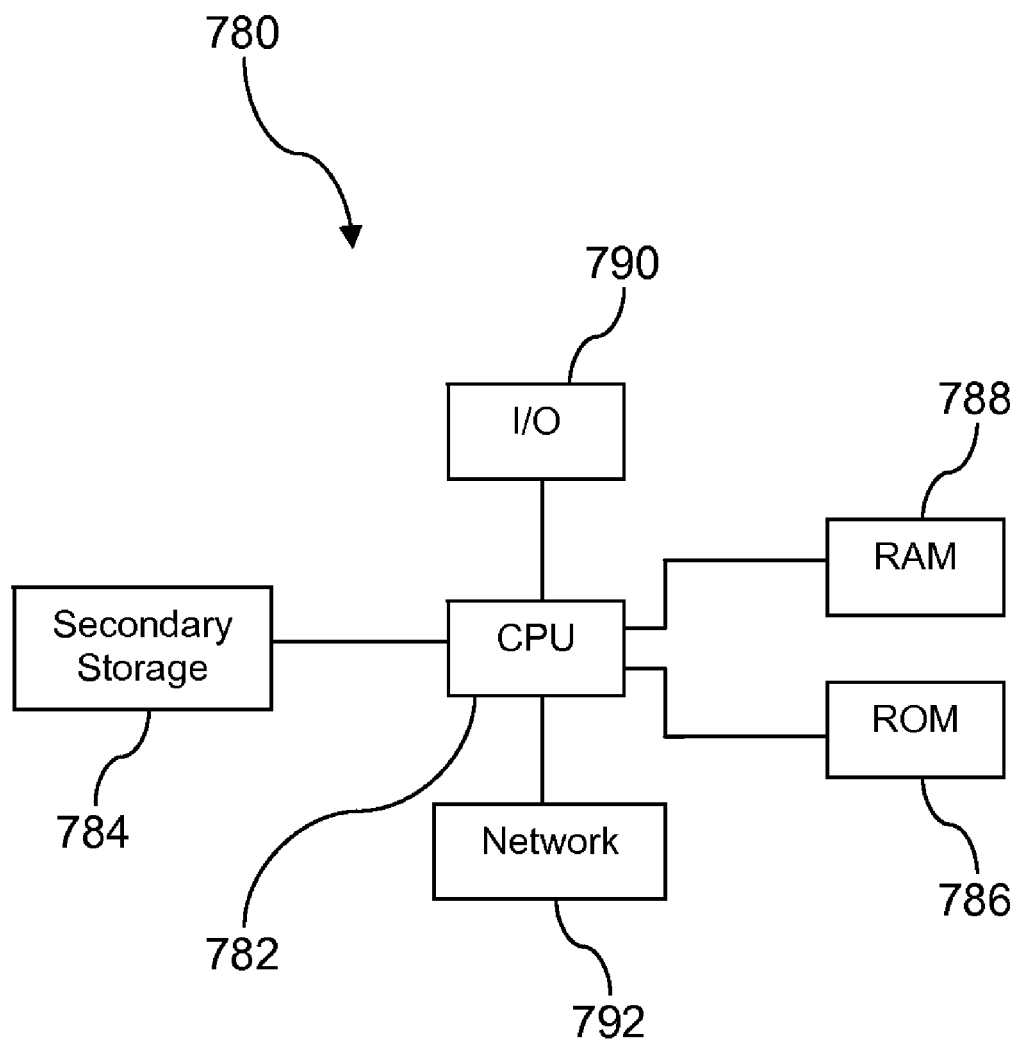
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method, comprising:
   detecting, by a merchandising server, a communications device initiating contact with an electronic storefront;
   determining, by the merchandising server, a balance of funds in a deposit account associated with the communications device and a services subscription account;
   reducing, by the merchandising server, the prices of selected electronic products for sale by the electronic storefront, wherein the selected electronic products bear prices higher than the balance of funds, and wherein the prices are reduced to levels one of at and below the balance of funds;
   transmitting, by the merchandising server, price information about the selected electronic products to the communications device, wherein the price information comprises the reduced prices of the selected electronic products; and
   transmitting, by the merchandising server, instructions to the communications device on the manner of presentation of the price information in the display of the communications device.

2. The method of claim 1, wherein the services subscription account is associated with a telecommunications services provider.

3. The method of claim 2, further comprising a user of the communications device periodically adding to the funds on deposit under the services subscription account and further comprising the telecommunications services provider debiting the funds on deposit upon usage of the services.

4. The method of claim 1, wherein the selected products are produced by one of the telecommunications services provider and a third-party provider of selected products.

5. The method of claim 4, wherein when the selected products are produced by the third-party provider of selected products, the discounts are approved by the third-party provider of selected products.

6. The method of claim 1, wherein the instructions transmitted additionally direct the presentation of price information for electronic products not subjected to price reductions, and wherein the electronic products not subject to price reductions comprise electronic products with individual prices equal to or less than the balance of funds.

7. The system of claim 6, wherein the selected electronic products and the electronic products not subject to price reductions comprise ring tones, music, electronic games, and software applications.

8. The method of claim 6, wherein the instructions transmitted direct the communications device to present in the display of the communications device the highest priced electronic products from the selected electronic products and the electronic products not subject to price reductions.

9. The method of claim 8, further comprising:
   receiving, by the merchandising server, a message from the communications device, the message purchasing at least one of the presented electronic products, the message further authorizing debiting the balance of funds by the purchase price of the at least one electronic product purchased; and
   transmitting, by the merchandising server, instructions to the communications device to present another group of electronic products in the display, the other group comprising the highest priced remaining electronic products from the selected electronic products and the electronic products not subject to price reductions with individual prices equal to or less than a new balance of funds in the deposit account after the debiting.

10. The method of claim 9, wherein the other group additionally comprises at least one electronic product not previously displayed with an individual price equal to or less than the new balance of funds, and wherein the at least one electronic product not previously displayed is the most expensive electronic product not previously displayed with an individual price equal to or less than the least expensive electronic product previously displayed.

11. The method of claim 1, wherein the balance of funds is determined each time the communications device engages in a session with any electronic storefront associated with the merchandising server.

12. The method of claim 1, wherein the services subscription account is a prepaid services subscription with a telecommunications service provider, and wherein the funds on deposit are debited upon usage of services by the communications device.

13. The method of claim 12, wherein the communications device receives a message from the telecommunications service provider when an amount of funds on deposit one of reaches and falls below a predetermined level.

14. The method of claim 1, wherein the electronic storefront is associated with one of a telecommunications service provider and a third-party vendor of products.

15. The method of claim 1, wherein the deposit account is held by a telecommunications service provider and is debited for wireless communications services provided by the telecommunications service provider and is debited for the products sold by at least one of the telecommunications service provider and a third-party vendor of products.

16. The method of claim 1, further comprising notifying a user of the communications device to add funds to the deposit account when the balance of funds in the deposit account falls below a predetermined level.

* * * * *